United States Patent
Keskula et al.

(10) Patent No.: US 7,432,005 B2
(45) Date of Patent: Oct. 7, 2008

(54) MODEL-BASED FEED-FORWARD CONTROL SYSTEM FOR POWER (OR CURRENT) IN A FUEL CELL SYSTEM

(75) Inventors: Donald H. Keskula, Webster, NY (US); Bruce J. Clingerman, Palmyra, NY (US)

(73) Assignee: General Motors Corporation, Detroit, MI (US)

( * ) Notice: Subject to any disclaimer, the term of this patent is extended or adjusted under 35 U.S.C. 154(b) by 576 days.

(21) Appl. No.: 10/134,669

(22) Filed: Apr. 29, 2002

(65) Prior Publication Data

US 2003/0203247 A1  Oct. 30, 2003

(51) Int. Cl.
*H01M 8/04* (2006.01)
*G06G 7/70* (2006.01)

(52) U.S. Cl. .......................... 429/23; 701/99; 701/106; 318/139

(58) Field of Classification Search ............. 429/12–52; 700/28–31; 703/2, 13
See application file for complete search history.

(56) References Cited

U.S. PATENT DOCUMENTS

| | | | |
|---|---|---|---|
| 4,839,246 A | 6/1989 | Takabayashi | |
| 5,780,981 A * | 7/1998 | Sonntag et al. | 318/139 |
| 5,925,089 A * | 7/1999 | Fujime | 701/106 |
| 6,265,092 B1 | 7/2001 | Meltser et al. | |
| 6,280,865 B1 | 8/2001 | Eisman et al. | |
| 6,393,354 B1 * | 5/2002 | Scheffler et al. | 701/99 |
| 2002/0182467 A1 * | 12/2002 | Ballantine et al. | 429/26 |

* cited by examiner

*Primary Examiner*—Patrick Ryan
*Assistant Examiner*—Keith Walker

(57) ABSTRACT

A control system and method controls an output of a fuel cell. A fuel cell stack controller that receives an output request signal and that generates an oxidant request signal and a fuel request signal using a first inverse model. A fuel delivery controller receives the fuel request signal, generates a fuel command using a second inverse model and generates a delivered fuel signal using a first model. An oxidant delivery controller receives the oxidant request signal, generates an oxidant command using a third inverse model and generates a delivered oxidant signal using a second model. The fuel cell stack controller receives the delivered oxidant signal from the second model and the delivered fuel signal from the first model and calculates a power available signal using a third model.

20 Claims, 4 Drawing Sheets

MODEL-BASED FEED-FORWARD CONTROL SYSTEM FOR POWER (OR CURRENT) IN A FUEL CELL SYSTEM

FIELD OF THE INVENTION

The present invention relates to fuel cells, and more particularly to fuel cell power (or current) control systems.

BACKGROUND OF THE INVENTION

Fuel cells are being used to power systems such as vehicles and stationary power plants. A fuel cell power module (FCPM) is often used to control power (or current) of the fuel cell. During operation, the system requests various power (or current) levels from the FCPM to satisfy a load condition. For example, a load condition in a vehicle increases when the driver depresses an accelerator and decreases when the vehicle is traveling on a downhill grade.

The system preferably knows the available power (or current) output of the FCPM. If the load is too low relative to supplied fuel and oxidant, the FCPM passes too much fuel out of the stack, which is inefficient and may damage downstream components. If the load is too high relative to the supplied fuel and oxidant, the fuel cell stack may be damaged.

Designing a closed loop control system for a fuel cell requires knowledge of both system loads (such as vehicle loads) and the fuel cell. A significant amount of calibration and tuning of the closed loop control system is typically required to obtain efficient operation. When inevitable design changes are made to the system or to the fuel cell, the closed loop control system must be recalibrated and retuned. This recalibration requirement reduces the flexibility of the fuel cell system, makes the fuel cell system less modular, and may require both the system and the fuel cell to be designed together.

One conventional control approach commands fuel and oxidant to the fuel cell and varies the load to accept the output of the fuel cell. This control approach severely restricts the architecture and operation of the system incorporating the fuel cell. For example, this approach was found to be unacceptable for vehicles. For consumer acceptance of fuel cell vehicles, fuel cells must respond more quickly and accurately to driver input. This control approach is better suited to components and subsystems where the load is not as critical.

Another control approach employs a closed loop control system that is based on a desired fuel cell output such as current or power. The fuel and oxidant inputs are modified until a desired output is achieved. Another approach commands fuel (such as $H_2$, natural gas, gasoline, liquid propane, methanol, etc.) and oxidant (such as oxygen or air). The input commands are then adjusted based on a resulting power output.

SUMMARY OF THE INVENTION

A control system and method according to the present invention controls an output of a fuel cell. A fuel cell stack controller receives an output request signal and generates an oxidant request signal and a fuel request signal using a first inverse model. A fuel delivery controller receives the fuel request signal, generates a fuel command using a second inverse model and generates a delivered fuel signal using a first model. An oxidant delivery controller receives the oxidant request signal, generates an oxidant command using a third inverse model and generates a delivered oxidant signal using a second model. The fuel cell stack controller receives the delivered oxidant signal from the second model and the delivered fuel signal from the first model and calculates a power available signal using a third model.

In other features, the first inverse model is an anode/cathode stack inverse model. The second inverse model is a fuel delivery inverse model. The third inverse model is an oxidant delivery inverse model. The first model is a fuel delivery model. The second model is an oxidant delivery model. The third model is an anode/cathode stack model.

In yet other features, the oxidant delivered signal and the fuel delivered signal are input to the first inverse model. A fuel actuator receives the fuel command from the fuel delivery controller. An oxidant actuator that receives the oxidant command from the oxidant delivery controller. A system controller sends the output request and receives the power available signal. The controlled output of the fuel cell is power or current.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
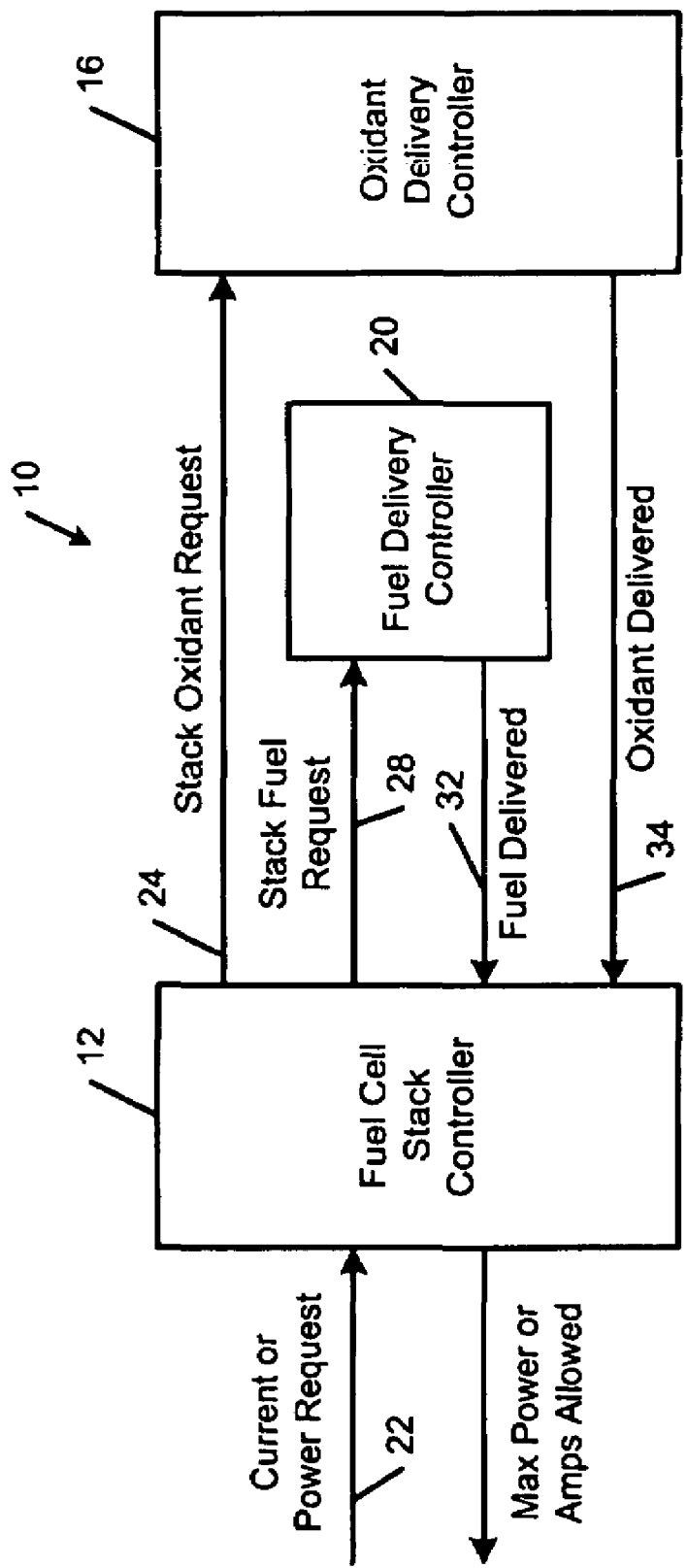
FIG. 1 is a functional block diagram of a fuel cell control system according to the present invention.

The following description of the preferred embodiment(s) is merely exemplary in nature and is in no way intended to limit the invention, its application, or uses. For purposes of clarity, the same reference numerals will be used in the FIGS. to identify similar elements.

The fuel cell control system according to the present invention controls inputs to a fuel cell power module (FCPM) using an accurate, flexible, and modular approach. The present invention allows the FCPM to be used in different applications or systems without requiring changes or modifications to the fuel cell control system. In the foregoing description, power and current can be used interchangeably.

Referring now to FIG. 1, a fuel cell power module (FCPM) 10 according to the present invention is shown and includes a fuel cell stack controller 12, an oxidant delivery controller 16, and a fuel delivery controller 20. A power request from a system controller (not shown) is made to the FCPM 10 as indicated at 22. The fuel cell stack controller 12 receives the request 22 and determines required fuel and oxidant as shown at 24 and 28. The fuel delivery controller 20 and the oxidant delivery controller 16 respond by delivering fuel such as $H_2$ or reformate and oxidant such as air or oxygen ($O_2$). The fuel delivery controller 20 and the oxidant delivery controller 16 generate delivered fuel and oxidant measurements as shown at 32 and 34.

Figure 2:
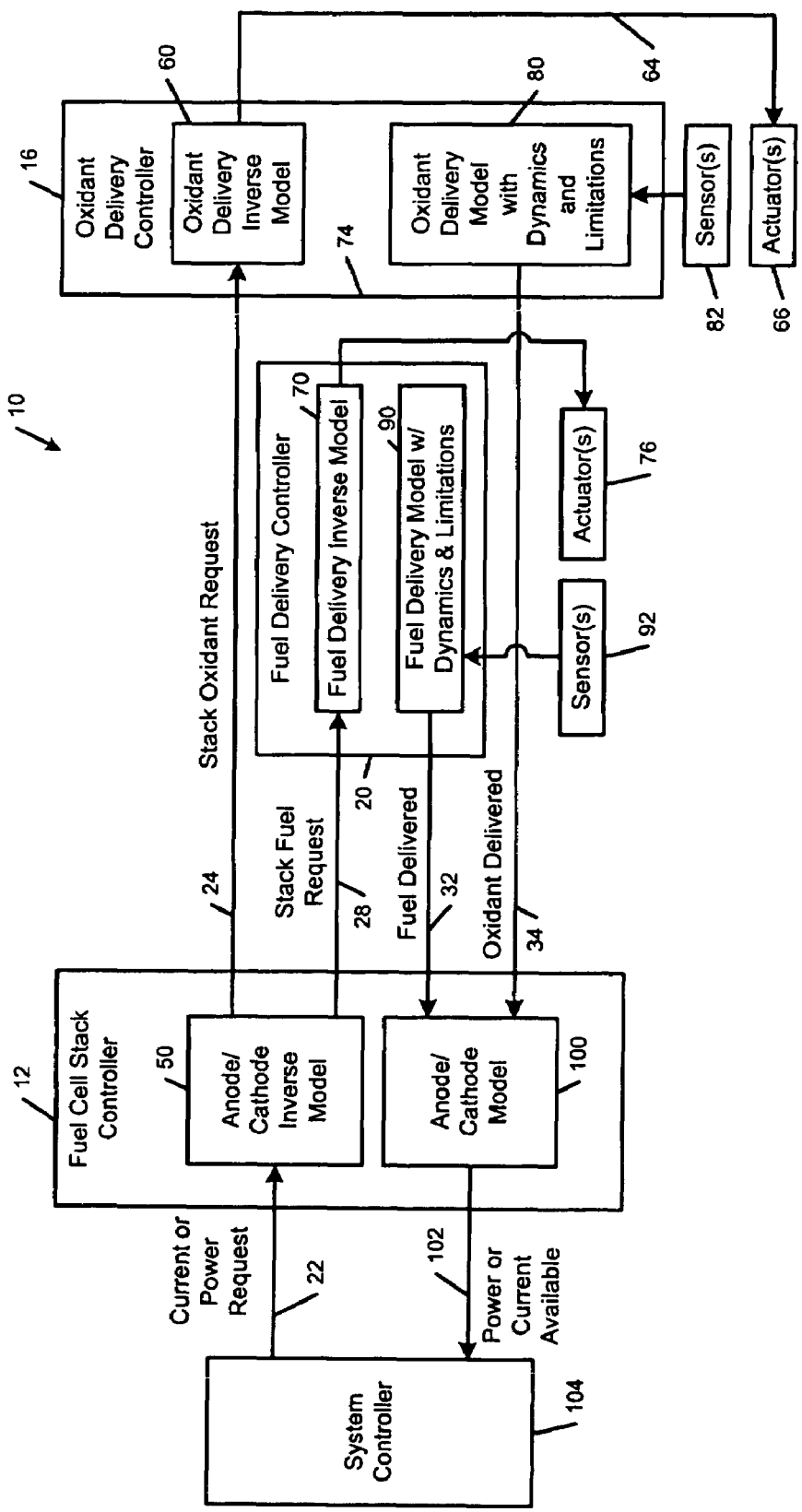
FIG. 2 is a functional block diagram of the fuel cell control system of FIG. 1 in further detail.
Figure 3:
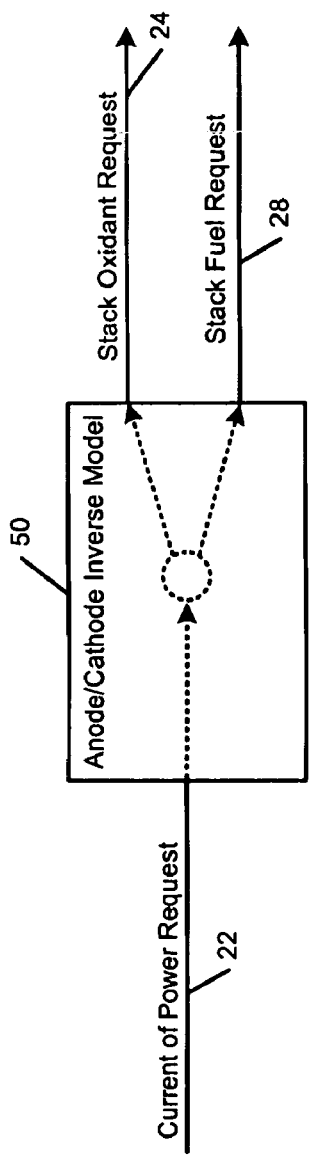
FIG. 3 is a functional block diagram of an anode/cathode stack inverse model for the fuel cell stack controller.
Figure 4:
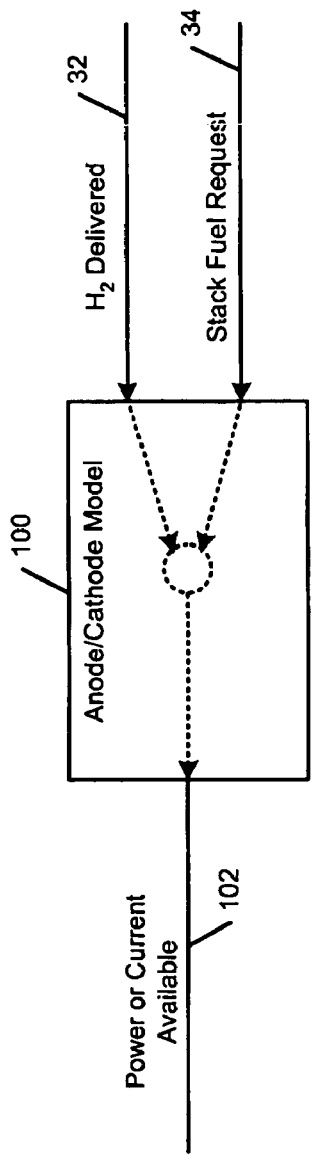
FIG. 4 is a functional block diagram of an anode/cathode stack model for the fuel cell stack controller.

Referring now to FIGS. 2, 3 and 4, the FCPM 10 is illustrated in further detail. The fuel cell stack controller 12 includes an anode/cathode stack inverse model 50 that determines the oxidant and fuel requests 24 and 28 based on the current or power request 22. As used herein, a model predicts the outputs based on a given set of inputs. An inverse model predicts the inputs based on a given set of outputs. The anode/cathode stack inverse model 50 sends the fuel request 28 to the fuel delivery controller 20, such as a $H_2$ tank controller, a fuel processor controller, etc. The anode/cathode stack inverse model 50 sends the oxidant request 24 to the oxidant delivery controller 16, such as a compressor. The oxidant delivery controller 16 processes the oxidant request 24 using an oxidant delivery inverse model 60, which generates an oxidant command at 64 that is output to one or more actuators 66. The fuel delivery controller 20 processes the fuel request 28 using a fuel delivery inverse model 70, which generates a fuel command at 74 that is output to one or more actuators 76.

As the actuator 66 that is associated with the oxidant delivery controller 16 implements the oxidant commands 64, actual data (such as temperature, pressure, flow, and/or other operating parameters) is input to an oxidant delivery model 80 of the oxidant delivery controller 16 using one or more sensors 82. The oxidant delivery model 80 calculates the actual oxidant delivered 34 to the fuel cell stack. Dynamics, such as transport delay of gases, thermal time delays, and/or other factors are inherently included in this information if included in the oxidant delivery model 80.

As the actuator 76 that is associated with the fuel delivery controller 20 implements the fuel command, actual data (such as temperature, pressure, flow, and/or other operating parameters) is input to a fuel delivery model 90 of the fuel delivery controller 20 using one or more sensors 92 (which may be the same as sensors 82). The fuel delivery model 90 calculates the actual fuel delivered 32 to the fuel cell stack. Dynamics, such as transport delay of gases, thermal time delays, and/or other factors are inherently included in this information if included in the fuel delivery model 90. Fuel and oxidant delivered values 32 and 34 and/or sensor data from sensors 82 and/or 92 are fed back to an anode/cathode stack model 100, which calculates a power available signal at 102. The power available signal 102 is sent to a system controller 104.

Figure 5:
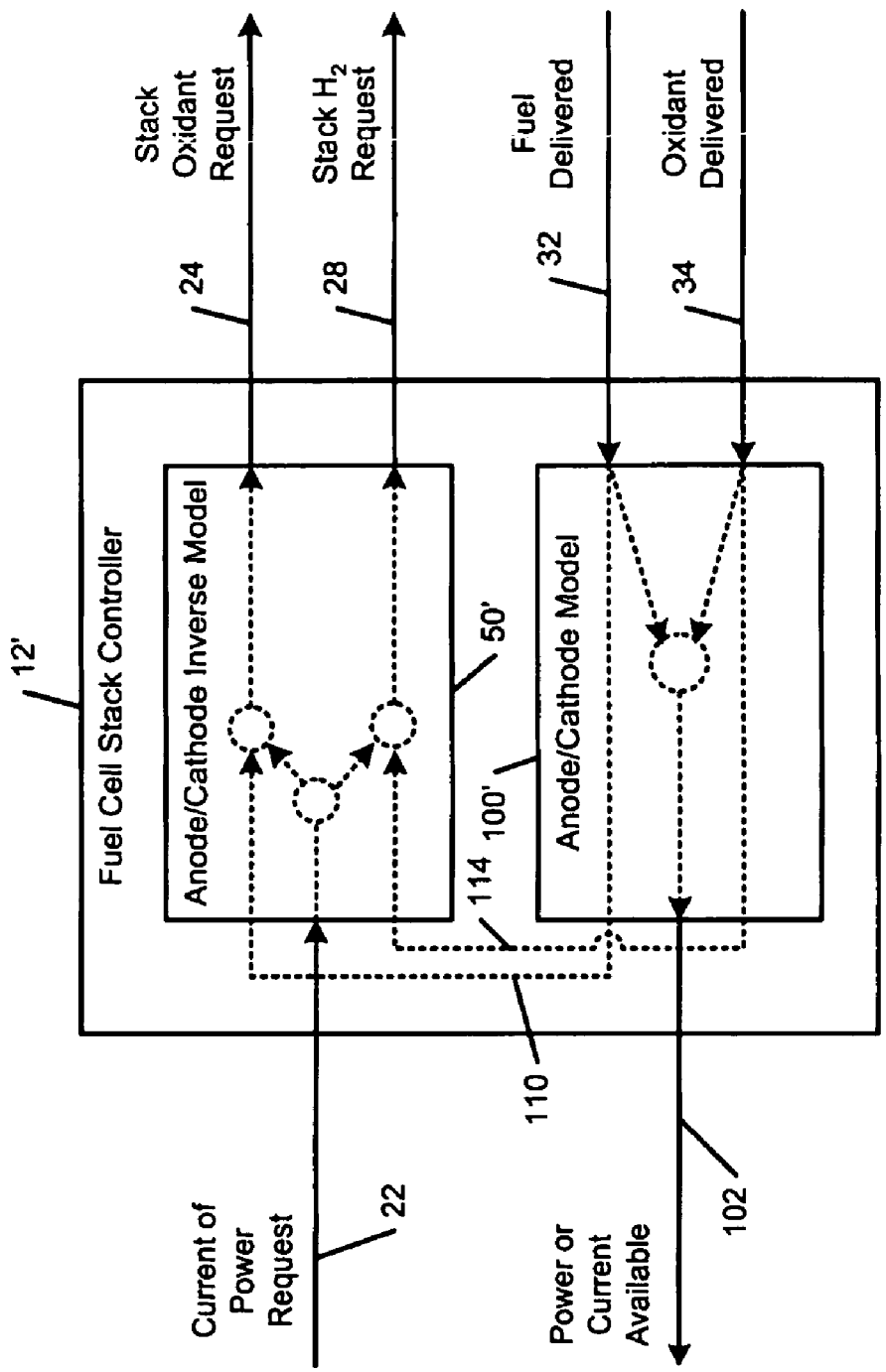
FIG. 5 is a functional block diagram of an alternate fuel cell stack controller.

Further improvements can be made by providing the fuel delivered signal 32 and oxidant delivered signal 34 to the anode/cathode stack inverse model 50 of the fuel cell stack controller 12. Referring now to FIG. 5, a modified fuel cell stack controller 12' is shown. A modified anode/cathode stack inverse model 50' receives fuel delivered and oxidant delivered as shown at 110 and 114, which are then used to calculate the fuel request at 28 and the oxidant request at 24.

The fuel cell stack controller 12 also calculates any additional control quantities that are required such as anode air bleed. Dynamics such as transport delay of gases and thermal time delays are inherently included in this information if included in the models. Any system degradation is also inherently accounted for in the information streams.

Because the information is model-based and utilizes actual sensor inputs, the information is also used to determine state transitions/requests to further simplify the interfaces. For example, the vehicle controller does not need to know the state of the FCPM 10 because the vehicle controller only needs a power available signal from the FCPM 10.

This control method allows for more efficient FCPM operation by balancing the anode and cathode flows. If either the cathode or anode side cannot deliver the appropriate amount of flow, the other side is lowered as well. For example, if catalyst degradation of a 60 kW system only permits 55 kW worth of anode flow, the air is not allowed to flow at a 60 kW level. The reduced anode flow is reported in the stack oxidant request 24 and the oxidant flow is adjusted to a new 55 kW level. This reduces the parasitic losses of the air compressor. Likewise, reduced oxidant performance reduces the anode flow to balance both anode and cathode.

Systems incorporating the present invention are much more robust. Instead of shutting down for a cathode or anode problem, the system adjusts and continues to run. The present invention schedules inputs to the FCPM 10 with an accurate, flexible, and modular approach. The present invention allows the FCPM 10 to be used in different applications without requiring changes or modifications to the interface between the system controller 104 and the FCPM 10. The interface is very simple and requires minimal interfacing between modules, which is critical for a modular system and software approaches. The design offers a precise, accurate, safer, and faster delivery of the fuel cell power to the load. In the case of a fuel cell vehicle, the present invention allows improved acceleration and more controlled deceleration. The present invention offers improved system efficiency by avoiding excess oxidant or fuel that the fuel cell stack is unable to utilize.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for controlling an output of a fuel cell, comprising:
   a fuel cell stack controller that receives an output request signal and that generates an oxidant request signal and a fuel request signal that is independent from the oxidant request signal using a first inverse model and the output request signal and without using an actual fuel cell power output, wherein the fuel cell stack controller stores the first inverse model;
   a fuel delivery controller that receives said fuel request signal, that generates a fuel command using a second inverse model and that generates a delivered fuel signal using a first model, wherein the fuel delivery controller stores the second inverse model and the first model; and
   an oxidant delivery controller that receives said oxidant request signal, that generates an oxidant command using a third inverse model and that generates a delivered oxidant signal using a second model, wherein the oxidant delivery controller stores the third inverse model and the second model,
   wherein said fuel cell stack controller receives said delivered oxidant signal from said second model and said delivered fuel signal from said first model and that calculates a power available signal using a third model, and the fuel cell stack controller stores the third model.

2. The control system of claim 1 wherein said first inverse model is an anode/cathode stack inverse model, said second inverse model is a fuel delivery inverse model, and said third inverse model is an oxidant delivery inverse model.

3. The control system of claim 2, wherein said first model is a fuel delivery model, said second model is an oxidant delivery model, and said third model is an anode/cathode stack model.

4. The control system of claim 3 further comprising:
a fuel actuator that communicates with said second inverse model and an oxidant actuator that communicates with said third inverse model.

5. The control system of claim 1 wherein said oxidant delivered signal from said second model and said fuel delivered signal from said first model are input to said first inverse model.

6. The control system of claim 1 further comprising a fuel actuator that receives said fuel command from said fuel delivery controller.

7. The control system of claim 1 further comprising an oxidant actuator that receives said oxidant command from said oxidant delivery controller.

8. The control system of claim 1 further comprising a system controller that sends said output request and that receives said power available signal.

9. The control system of claim 1 wherein said controlled output of said fuel cell is current.

10. The control system of claim 1 wherein said controlled output of said fuel cell is power.

11. A method for controlling an output of a fuel cell, comprising:
generating an oxidant request signal and a fuel request signal that is independent from the oxidant request signal based on an output request using a first inverse model that is stored at a fuel cell stack controller and without using an actual fuel cell power output;
generating a fuel command based on said fuel request signal using a second inverse model that is stored at a fuel delivery controller;
generating a delivered fuel signal using a first model that is stored at the fuel delivery controller;
generating an oxidant command based on said oxidant request signal using a third inverse model that is stored at an oxidant delivery controller;
generating a delivered oxidant signal using a second model that is stored at the oxidant delivery controller; and
calculating a power available signal based on said delivered oxidant signal from said second model and said delivered fuel signal from said first model using a third model that is stored at the fuel cell stack controller.

12. The method of claim 11 further comprising:
basing said first inverse model on an anode/cathode stack inverse model, basing said second inverse model on a fuel delivery inverse model, and basing said third inverse model on an oxidant delivery inverse model.

13. The method of claim 12 further comprising:
basing said first model on a fuel delivery model, basing said second model on an oxidant delivery model, and basing said third model on an anode/cathode stack model.

14. The method of claim 13 further comprising:
transmitting said fuel command to a fuel actuator; and
transmitting said oxidant command signal to an oxidant actuator.

15. The method of claim 11 further comprising using said oxidant delivered signal from said second model and said fuel delivered signal from said first model as an input to said first inverse model.

16. The method of claim 11 further comprising transmitting said fuel command from said fuel delivery controller to a fuel actuator.

17. The method of claim 11 further comprising transmitting said oxidant command from said oxidant delivery controller to an oxidant actuator.

18. The method of claim 11 further comprising:
sending said output request to said first inverse model using a system controller; and
sending said power available signal to said system controller using said third model.

19. The method of claim 11 further comprising controlling power output of said fuel cell.

20. The method of claim 11 further comprising controlling current output of said fuel cell.

* * * * *